United States Patent [19]
Rushmore et al.

[11] Patent Number: 5,496,574
[45] Date of Patent: Mar. 5, 1996

[54] ENCAPSULATED SENSORY AGENTS

[75] Inventors: Dean F. Rushmore; Oliver Chmiel, both of Marysville, Ohio; Marc Furrer, La Sarraz, Switzerland; Richard T.-S. Liu, Worthington, Ohio

[73] Assignee: Nestec S.A., Vevey, Switzerland

[21] Appl. No.: 382,364

[22] Filed: Feb. 1, 1995

[51] Int. Cl.⁶ ........................... A23F 5/46
[52] U.S. Cl. ................ 426/98; 426/285; 426/293; 426/596; 426/602; 426/651; 426/591
[58] Field of Search ....................... 426/594, 650, 426/651, 285, 98, 96, 289, 293, 596, 591

[56] References Cited

U.S. PATENT DOCUMENTS

| | | | |
|---|---|---|---|
| 3,495,988 | 2/1970 | Balassa | 426/594 |
| 3,809,770 | 5/1974 | Jolly . | |
| 3,821,447 | 6/1974 | Jasovsky et al. . | |
| 3,823,241 | 7/1974 | Patel et al. . | |
| 3,989,852 | 11/1976 | Palmer . | |
| 4,156,031 | 5/1979 | Hamell | 426/610 |
| 4,293,581 | 10/1981 | Hersbrunner | 426/630 |
| 4,389,422 | 6/1983 | Hudak | 426/650 |
| 4,517,120 | 5/1985 | Roychoudhury | 426/655 |
| 4,520,033 | 5/1985 | Tout | 426/651 |
| 4,544,567 | 10/1985 | Gotterman | 426/594 |
| 4,551,345 | 11/1985 | Davidescu | 426/594 |
| 4,576,826 | 3/1986 | Lui | 426/650 |
| 4,594,285 | 6/1986 | Vitti | 426/285 |
| 4,634,598 | 1/1987 | Lui | 426/650 |
| 5,030,473 | 7/1991 | Ghodsizadeh . | |
| 5,182,926 | 2/1993 | Carns et al. . | |
| 5,222,364 | 6/1993 | Carns et al. . | |
| 5,338,555 | 8/1994 | Caly . | |

FOREIGN PATENT DOCUMENTS

| | | |
|---|---|---|
| 837021 | 3/1970 | Canada . |
| 0008015 | 10/1982 | European Pat. Off. . |
| 0133636 | 1/1987 | European Pat. Off. . |

OTHER PUBLICATIONS

Sivetz, M. & Derosier, N. W.; 1979; Coffee Technology; The Avi Publishing Company, Inc., pp. 434–483.

*Primary Examiner*—Carolyn Paden
*Attorney, Agent, or Firm*—Vogt & O'Donnell

[57] ABSTRACT

A process for encapsulating an aroma or flavour for a beverage. An oil-in-water emulsion is formed from a hydrolyzed vegetable oil, an aqueous medium, and a water-soluble, carbohydrate-based, film forming agent. A sufficient amount of the film forming agent is added so that the aqueous phase of the emulsion contains at least 50% by weight of the film forming agent. The oil-in-water emulsion is sprayed onto a soluble beverage powder whereupon the aqueous layer of each droplet rapidly desiccates to form the capsules; the moisture content of soluble beverage powder after spraying being less than 5% by weight. In use, the soluble beverage powder is dissolved in hot water to release the aroma or flavour.

21 Claims, No Drawings

ENCAPSULATED SENSORY AGENTS

FIELD OF THE INVENTION

This invention relates to a process for encapsulating sensory agents such as aromas and flavours and the capsules so produced. The capsules may be added to soluble beverages, for example soluble coffee, to provide an aroma or flavour burst upon dissolution of the soluble beverage in hot water.

BACKGROUND TO THE INVENTION

It is often advantageous to include sensory agents such as aroma and flavour in many soluble beverage products. For example, it generally found in the coffee industry that consumers associate quality coffee with a good coffee aroma. If a coffee product lacks coffee aroma, consumer perception of the product is adversely affected. Unfortunately, soluble (or as it is commonly known, instant) coffee is almost entirely aromaless. For this reason, it is conventional to trap coffee aromas which are given off during the processing of the soluble coffee and to later reincorporate these aromas into the soluble coffee.

Various techniques have been attempted for reincorporating coffee aroma into soluble coffee. One commonly used technique for reincorporating the aroma is to first capture the aroma into a suitable substrate. Suitable procedures for carrying out the capture of the aroma are disclosed in, for example, U.S. Pat. Nos. 3,823,241, 5,030,473, and 5,222,364 but many other techniques are known. Usually a coffee oil, an emulsion of coffee oil, or a coffee extract, is used as the substrate. The aroma-containing substrate is then usually mixed with the soluble coffee powder prior to the coffee powder being filled into containers, which are then sealed. Unfortunately, the aroma usually escapes readily from the substrate, requiring the coffee jar to be carefully sealed to retain the aroma. However, once the consumer breaks the seal, it is usually not too long before the aroma is lost. Also, although these techniques are able to provide aroma in the coffee jar for a limited time, very little aroma is provided above a cup of coffee made from the coffee powder.

These problems have led to various attempts to encapsulate the coffee aroma to retain the aroma until the soluble coffee is dissolved in hot water. The intention is to cause the release of coffee aroma from the cup. One attempt is described in U.S. Pat. No. 3,989,852 which discloses a process of preparing coffee aroma capsules by formulating the aroma into a viscous medium with a low moisture content. The viscous medium is then formed into tacky particles which are then rolled in a film forming agent. The film forming agent is then allowed to dry to provide a capsule about the aroma. Unfortunately, the amount of aroma that may be encapsulated per capsule using this process is rather low. It is also found that the capsules do not retain the aroma for any considerable length of time.

European patent application 0 008 015 discloses a process for encapsulating coffee aroma in which an aromatic coffee distillate is mixed with coffee oil to provide a water-in-oil emulsion. The water-in-oil emulsion is then atomized and the individual droplets are rolled in fine coffee powder. The droplets are then allowed to dry to form a capsule of dried coffee solids about an oil core which contains the aroma. Although the capsules are satisfactory, some aroma loss occurs during the encapsulation process.

Canadian Patent 837,021 discloses a process for encapsulating coffee aroma in which coffee oil is homogenized with a coffee extract containing up to 40% coffee solids. An aroma condensate is then stirred into the homogenized mixture. The mixture is then sprayed onto soluble coffee powder and the coffee powder mixed and tempered to equilibrate the moisture throughout the coffee powder. After tempering, the moistened powder is vacuum dried. Unfortunately, considerable amounts of aroma are lost during vacuum drying.

Similar problems occur with the encapsulation of flavours and aromas in beverages such as soluble teas, cocoa and chocolate drinks, instant dried soups, flavoured coffees (roast and ground as well as soluble), coffee and tea creamers, and the like.

Therefore there is still a need for a simple, yet effective encapsulation technique which provides capsules having good capacity for sensory agents and good retention of the encapsulated sensory agent.

SUMMARY OF THE INVENTION

Accordingly in one aspect, this invention provides a process for encapsulating a sensory agent, the process comprising:

forming an oil-in-water emulsion from a hydrolyzed oil, an aqueous medium, and water-soluble, carbohydrate-based, film forming agent, the aqueous phase of the emulsion containing at least 50% by weight of the film forming agent and the emulsion containing the sensory agent, and spraying the oil-in-water emulsion onto soluble beverage powder; the moisture content of the soluble beverage powder after spraying being less than 5% by weight.

The droplets of oil-in-water emulsion on the soluble beverage powder dry rapidly to form capsules made of the film forming agent about the vegetable oil core, the capsules being attached to the powder. The capsules formed in this way have surprisingly good capsule walls and aroma or flavour retention and, when dissolved in hot water, readily release aroma or flavour to provide an excellent above the cup aroma or in cup flavour. Further, the components of the capsules, as well as the capsules themselves, do not need to undergo any thermal treatment or vacuum drying steps. Hence thermal damage of the aroma or flavour and aroma or flavour loss during vacuum drying is avoided. Further, because the encapsulation occurs in the soluble beverage powder, any excess sensory agent is absorbed into the finished product. This avoids the intrinsic loss of the prior art.

The oil-in-water emulsion may be prepared by first forming a water-in-oil emulsion by combining the hydrolyzed oil and the aqueous medium and then adding the film forming agent to cause a phase inversion. In this case, the film forming agent may be added in the form of a concentrated extract or in the form of dried, powdered, soluble solids. The amount of the aqueous medium initially added is adjusted in accordance with the form of the film forming agent to obtain the correct total concentration in the aqueous phase.

Alternatively, the oil-in-water emulsion may be prepared by first forming the aqueous phase by dissolving the film forming agent in the aqueous medium and then mixing in the hydrolyzed oil. Alteratively, the aqueous phase may be added to the vegetable oil until the aqueous phase becomes the continuous phase.

Preferably the hydrolyzed vegetable oil comprises from about 20% to about 90% free fatty acids and about 80% to about 10% mono-, di- and/or triglycerides; more preferably about 60% to about 85% free fatty acids and about 40% to about 15% mono-, di- and/or triglycerides. For example, the hydrolyzed vegetable oil may comprises about 80% free fatty acids and about 20% mono-, di- and/or triglycerides.

Preferably, the concentration of the film forming agent in the aqueous phase is in the range of 50 to 75% by weight; for example 55 to 65% by weight.

The sensory agent may be incorporated in the hydrolyzed oil or in the components of the aqueous phase prior to formation of the emulsion. Alternatively, the sensory agent may be incorporated after the formation of the emulsion. The sensory agent may be an aroma or a flavour.

Preferably, the film forming agent is in the form of soluble coffee solids. However, any suitable carbohydrate based substance which is able to form a capsule wall may be used; for example soluble tea solids, maltodextrin, gum arabic, soluble cocoa solids and the like may also be used. Similarly, the hydrolyzed oil is preferably hydrolyzed coffee oil and the sensory agent is preferably a coffee aroma.

For a coffee product, the amount of hydrolyzed coffee oil in the oil-in-water emulsion is preferably in the range of 5 to 20% by weight; more preferably 10 to 16% by weight. For example, the amount of hydrolyzed coffee oil in the oil-in-water emulsion may be about 13 to 14% by weight.

Preferably, the process further comprises the step of homogenizing the oil-in-water emulsion. If the sensory agent is not already added, it is added at this stage. The emulsion is preferably sprayed through an atomizing nozzle which atomizes the emulsion into droplets of size in the range of about 0.25 mm to 1.3 mm; more preferably from about 0.4 to about 1 mm.

The beverage powder is preferably agitated while the emulsion is sprayed on it. The amount of emulsion sprayed on the beverage powder is preferably selected so that the moisture content of the beverage powder after spraying is less than 4% by weight; more preferably less than 3% by weight. For example, the total moisture added to the beverage powder by the emulsion may be less than 1% by weight. The amount of oil added to the beverage powder by the emulsion may be about 0.1% to 1% by weight; preferably about 0.2% to 0.4% by weight. However, if the formation of oil slicks on the top of the beverage is not a problem, larger amounts of oil may be added.

In another aspect, this invention provides a soluble beverage powder comprising particles of soluble beverage having a moisture content of less than 5% by weight and to which are attached capsules; each capsule comprising an encapsulating layer of a water-soluble, carbohydrate-based, film forming agent about a core of a hydrolyzed vegetable oil which contains a sensory agent.

The soluble beverage powder has the significant advantage that the capsules are attached to the particles of beverage. In conventional formulations, the capsules are merely mixed in with the particles. This often results in separation during storage which may lead to inconsistent dosages. These problems are avoided by the soluble beverage powder as defined above. Further very little loss, if any, of aroma occurs during storage of the soluble beverage powder.

Also, once dissolved in hot water, the hydrolyzed vegetable oil is able to spontaneously form an oil-in-water emulsion with the hot water. The emulsion formed includes droplets of dispersed lipid medium which have the characteristics of a microemulsion. A microemulsion is a thermodynamically stable, clear liquid which forms spontaneously upon addition of its components and which contains a lipid phase and an aqueous phase. In order to be clear, the droplets of the dispersed phase have a droplet size less than 200 nm; and preferably less than 100 nm. Since a microemulsion is clear and thermodynamically stable, the lipid medium does not form oil slicks in the aqueous medium. Hence the soluble beverage powder has the substantial advantage of reduced possibility of oil slicks forming on the surface of the beverage. This becomes particularly useful if it is desired to increase the oil content of the beverage. Further, in a microemulsion, because the droplets of the dispersed phase are very small, the surface area of the dispersed phase, and hence the surface area for sensory agent release, is very large. Thus, upon dissolution in hot water, the soluble beverage powder provides a burst of aroma above the cup or flavour in the cup upon addition of hot water; a very significant advantage.

DETAILED DESCRIPTION OF THE INVENTION

Embodiments of the invention are now described by way of example only. The invention will be described primarily with reference to the incorporation of coffee aroma into soluble coffee but it is to be appreciated that the invention is not limited to soluble coffee or to coffee aroma. The principles behind this specific example are applicable to other beverages and sensory agents.

To produce coffee aroma capsules, an oil-in-water emulsion is produced from a hydrolyzed coffee oil and an aqueous medium. The coffee oil which is hydrolyzed may be any desired coffee oil; for example coffee oil obtained from commercial sources or produced by extracting it from spent coffee grounds and the like using procedures which are well known in the art. For example, the oil may be expelled from freshly roasted coffee beans using commercially available oil expellers. This technique and other suitable techniques for extracting coffee oil from coffee beans, are described in Sivetz, M, & Desrosier, N. W.; 1979; *Coffee Technology*, The AVI Publishing Company, Inc., pages 452 to 460; the disclosure of which is incorporated by reference. The source and the exact composition of the coffee oil used is not critical.

The coffee oil may be hydrolyzed by any suitable hydrolysis procedure. For example, the coffee oil may be subjected to alkaline hydrolysis in a manner similar to conventional saponification processes for fats and oils. The alkaline used in the procedure may be any suitable alkaline but alkaline based upon alkali and alkali earth metal hydroxides are preferred since these metals occur naturally in coffee. Hence, if complete removal of the alkaline from the hydrolyzed coffee oil is not possible, the final product would still not have a composition different from coffee. The alkali metal hydroxide KOH is particularly preferred. The hydrolysis may be terminated in a conventional manner; for example by adding an acid. Again the acid used is best selected from acids which do not markedly affect the composition of the coffee product. For example, HCl may be used. This procedure gives particularly good results with high conversion of the coffee oil into free fatty acids; for example up to about 80%.

Alternatively, the coffee oil may be subjected to steam stripping at temperatures in the range of about 90° C. to about 210° C. Such a process may be carried out in a high pressure reactor using direct injection of steam at high pressure. This procedure has the advantage that trace elements are not added to the coffee oil during hydrolysis but the extent of hydrolysis may be lower; for example around 20 to 25%.

Another procedure for hydrolyzing the coffee oil is to react the coffee oil with between 5 to 20% by weight water in a sealed reactor. Reaction temperatures in the range of about 175° C. to 260° C. may be used. Reaction times of about 30 minutes to 2 hours are suitable. Particularly good results are obtained with about 10% by weight water reacted at 245° C. for 1 hour. Usually the hydrolysis is terminated by allowing the reaction mixture to cool. This procedure also has the advantage that trace elements are not added to the coffee oil. However, the procedure has the further advantage that high levels of free fatty acids are readily obtainable; for example up to 80%.

It will be appreciated that the hydrolyzed oils produced by these processes will not be completely hydrolyzed in that amounts of mono-, di- and/or triglycerides will be present in the product oil. Further, it is necessary for the formation of a microemulsion for amounts of the glycerides to be present. Therefore it is to be understood that in this specification the term "hydrolyzed vegetable oil" means a vegetable oil which has been partially hydrolyzed and thus contains amounts of mono-, di- and/or triglycerides; for example from about 5% to about 90% by weight mono-, di- and/or triglycerides.

The hydrolyzed oils so produced usually have a melting point above about 30° C. and therefore they are solid at room temperature. This has the advantage of better entrapment of the aroma in the hydrolyzed oil. However, this does mean that the hydrolyzed coffee oil must be heated to a little above its melting point when producing the emulsion. Similarly, the other components of the emulsion should be heated to a little above the melting point of the hydrolyzed coffee oil.

The aqueous medium used may be water, a coffee extract or an aqueous aroma distillate. In fact, the aqueous medium may be any suitable mixture which contains water. However if the final product is to be described as 100% coffee, only water and components naturally existing in coffee should be used.

To produce the emulsion, the aqueous medium may be added to the hydrolyzed coffee oil under stirring to produce a water-in-oil emulsion. If desired, the emulsion may be homogenized. The soluble coffee solids are then added to the emulsion to cause the emulsion to undergo a phase inversion to form an oil-in-water emulsion. Alternatively, the coffee oil may be added to an aqueous phase of a concentrated coffee extract. As another alternative, an aqueous phase of a concentrated coffee extract may be added to hydrolyzed coffee oil until the aqueous phase becomes the continuous phase. In fact, any suitable procedure for arriving at an oil-in-water emulsion may be used.

The amount of soluble coffee solids which is added must be sufficient so that the aqueous phase of the oil-in-water emulsion has a soluble coffee solids content of at least 50% by weight. The form in which the coffee solids are added may be selected as desired. For example, the soluble coffee solids may be added in the form of a concentrated coffee extract. This extract may be obtained by suitably concentrating a coffee extract obtained from a coffee extraction process. Suitable extraction and concentration processes are well known and examples are described in Sivetz & Desrosier (1979). If the soluble solids are added in this form, the amount of aqueous medium used to create the water-in-oil emulsion must be adjusted to ensure that the total soluble solids concentration in the aqueous phase of the oil-in-water emulsion remains above 50%. As an alternative, the soluble coffee solids may be added in solid form; that is as a powder obtained from a soluble coffee process. In this case, the solids may be finely ground. If the concentration of the coffee solids is too high (leading to unacceptably high viscosities), the aqueous phase may be diluted.

Once the oil-in-water emulsion has formed, the emulsion is homogenized using suitable homogenizing equipment. The emulsion is stable and may be stored; preferably at low temperatures, for example 0° to 10° C. Then, to reincorporate the aroma into soluble coffee powder, the emulsion is sprayed on soluble coffee powder.

Conveniently the aroma is added prior to spraying of the emulsion. This may be carried out by mixing the aroma into the emulsion using a suitable mixer; for example in a ribbon blender or an in-line or static mixer. The aroma used is preferably an aroma frost collected by cryogenic procedures; such as described in U.S. Pat. No. 5,182,926 (the disclosure of which is incorporated by reference). However any suitable or desired procedure may be used; of which many are described in Sivetz & Desrosier (1979) and U.S. Pat. Nos. 3,823,241, 5,030,473, and 5,222,364.

It is also possible to add the aroma to one of the components of the emulsion prior to forming of the emulsion. Depending upon the solubility of the aroma, it may be mixed in with either the hydrolyzed coffee oil, the coffee solids or the aqueous medium. Aroma added to the aqueous phase is ultimately taken up by the oil phase. The disadvantage of adding the aroma to one of the components is that, to reduce aroma loss, the emulsion should be used as soon as possible. If necessary, the aromatized emulsion may be stored for one to three days at about 5° C. However it is usually best to spray the emulsion immediately after adding the aroma.

Typically the amount of aroma added to the emulsion will vary depending upon the desired aroma strength and the type of aroma; and this can vary widely. For example, if an aroma frost is used and the soluble coffee is intended for the North American market, the targeted amount of aroma frost is that which provides a stoichiometric reconstitution.

The emulsion is sprayed using a suitable atomizing spraying apparatus. A spray nozzle which is able to atomize the emulsion into droplets of size in the range of 0.1 mm to 1.5 mm is particularly suitable. A single fluid nozzle is particularly suitable but two fluid nozzles may also be used even though aroma loss due to stripping may occur. If a two fluid nozzle is used, a substantially inert gas such as nitrogen or carbon dioxide may be used as the atomizing fluid. Examples of suitable nozzles may be obtained from Spraying Systems Company, North Avenue at Schmale Road, Wheaton, Ill., USA. If necessary, the emulsion may be heated slightly to reduce its viscosity for spraying.

The emulsion is sprayed onto soluble coffee powder which is agitated in a pan coater, tumbler, fluidized bed coater, or similar equipment. Clearly, any procedures conventionally used such as spraying a falling curtain of coffee powder or spraying coffee moving on continuous belt, may also be used. The process may be batch or continuous as desired. The soluble coffee powder is any suitable spray or freeze dried soluble coffee product. The amount of emulsion sprayed on the soluble coffee powder is such that the total moisture content of the soluble coffee powder after spraying does not rise above about 5% by weight. It is preferred, however, that the emulsion at most raises the moisture content of the soluble coffee powder by about 1% by weight. Further, the coffee oil content of the sprayed powder should be in the range of 0.1 to 1% by weight.

As the droplets of emulsion strike the coffee powder particles, they attach to the particles and the outer, aqueous layer of each droplet rapidly desiccates by equalisation of moisture in the outer, aqueous layer of each droplet and the particle of coffee powder. This leaves the coffee solids forming a robust capsule around the oil core. These capsules remain firmly attached to the particles of coffee powder. Also, in an environment with sufficiently low humidity the droplets would desiccate over time; often rapidly.

The capsules formed in this way entrap the aroma and hold it for extended periods of time. Also trials conducted have shown that most of the aroma added is incorporated into the capsules and hence in the soluble beverage powder; unlike the prior art techniques in which significant aroma loss during capsule formation occurs. Further, once the aroma has been encapsulated and the aromatized coffee powder is vacuum sealed in a jar, the coffee powder should still retain the aroma completely until at least the consumer first opens the jar. Importantly, however, even after opening of the jar, aroma retention remains good until consumption.

Since the aroma is entrapped within the capsule and this is only released upon destruction of the capsule on adding the powder to hot water, the coffee powder in the jar will have little aroma. Therefore, if desired, aroma in a less stable formulation may be added to the coffee powder in the jar to provide "in jar" aroma. For example, capsules with thinner walls may be used.

For beverages other than coffee or for a coffee beverage which is not 100% coffee, any suitable hydrolyzed vegetable oil may be used as a replacement for hydrolyzed coffee oil. Specific examples of oils include sunflower oil, soybean oil, maize oil, safflower oil, rapeseed oil, cottonseed oil, peanut oil, olive oil, and the like. Similarly, the coffee aroma may be replaced by any other aroma or flavour; natural or synthetic. For example, for flavoured coffees, vanilla flavour, hazelnut flavour and the like may be incorporated. For teas, jasmine, bergamot, and the like flavours or aromas may be incorporated. For chocolate drinks, chocolate flavour may be included. Other suitable flavours are fruit flavours, and meat and savoury flavours (particularly for instant soups).

The film forming agent may be any suitable carbohydrate-based agent which is water soluble and which is able to form a wall. For example, soluble tea solids may be used for tea beverages. For chocolate drinks, soluble cocoa solids or a chocolate drink base such as described in U.S. Pat. No. 5,338,555, the disclosure of which is incorporated by reference. For soups, gums, vegetable solids and the like may be used.

EXAMPLE 1

Alkaline Hydrolysis of Coffee Oil

A 600 ml sample of a coffee oil is placed in a reaction vessel in a water bath at 70° C. An aliquot of 200 ml of 2N KOH is added to the sample and the mixture incubated for 2 hours at 70° C. The reaction is stopped by adding 70 ml of 6N HCl.

Upon addition of the HCl, the mixture separates into an aqueous phase and an oil phase, the latter solidifying with cooling. Upon solidification of the oil phase, the aqueous phase is discarded leaving the hydrolyzed oils. The melting point of the hydrolyzed oil is determined to be about 45° C.

A sample of 20 µg of the hydrolyzed oil is dissolved in 20 µl of a 2:1 chloroform:hexane mixture and then applied on a HPTLC plate (silica gel 60 F 254 obtained from Merck GmbH, Darmstadt, Germany) using capillaries. The plates are then subjected to HPTLC analysis using the two-stage development technique described in Jork et al; 1989; *Dünnschicht-Chromatographie*, Band 1a, Merck, VCH, Weinheim, Germany, pages 327 to 330. The composition of the neutral lipids is then determined by titration or gas chromatography. The composition for the sample is as follows:

| Lipid | Content, mass % |
| --- | --- |
| Triglycerides | about 10 |
| Diglycerides | about 5 |
| Monoglycerides | 1 to 5 |
| Free fatty acids | 80 to 85 |

EXAMPLE 2

Production of Coffee Aroma Capsules

Hydrolyzed coffee oil from example 1, water and soluble coffee solids, in a mass ratio of 1:2.25:3.2 are mixed in a water bath at 55° C. The aqueous phase of resulting oil-in-water emulsion has a 59% by weight soluble coffee solids content. The oil-in-water emulsion is then homogenized in a Gilford-Wood homogenizer.

A coffee aroma frost, prepared using the procedure described in U.S. Pat. No. 5,182,926, is mixed into the homogenized emulsion using a ribbon blender. The aromatized emulsion is then pumped through a 1/4 J series air atomizing nozzle obtained from Spraying Systems Company at a rate of 6 to 10 ml/minute and sprayed on a charge of about 2 kg of soluble coffee powder in a pan coater or tumbler. Nitrogen or Carbon dioxide gas is used to atomize the emulsion in the nozzle into droplets of size about 0.4 to 1 mm. The amount of emulsion sprayed on the soluble coffee powder is sufficient to provide the coffee powder with a 0.4% by weight coffee oil content. The outer layer of the droplets dries rapidly leaving capsules firmly attached to the particles of coffee powder. The moisture content of the soluble coffee particles is between 3 to 4%.

EXAMPLE 3

Capsule Integrity, Aroma Release, and Slick Formation

Tests are conducted using a sample of coffee powder containing capsules produced according to Example 2 (Sample 1) and a sample of coffee powder produced by a conventional technique of plating a water-in-oil emulsion onto coffee powder (Sample A). Both samples contain about 0.4% added coffee oil in the capsules.

Samples 1 and A are subjected to Soxhlet analysis to determine the percent oil in soluble coffee powder. Petroleum ether or hexane extraction yields a much higher extracted oil value for Sample A than for Sample 1. Further amounts of samples 1 and A are analysed to determine the total amount of coffee oil by dissolving the capsules in hot water. The released oil is then absorbed on celite, which is dried and extracted with non-polar solvents. The total oil for each sample is then determined. These results indicate clearly that the capsule of Sample 1 protects the oil; indicating a thick, well formed capsule.

A teaspoon of each sample is dissolved in a cup of hot water and a test panel of tasters is asked to sniff above the cup. The coffee produced from Sample 1 is perceived by most to have the stronger aroma. Further, most of the panel prefers the aroma produced by Sample 1; perceiving it to be of better quality.

The results indicate that Sample 1 has a well formed, stable capsule which retains the aroma to a much greater extent than the conventional formulation. However, upon dissolution in hot water, the capsule releases the aroma rapidly.

Small amounts of very fine droplets of oil are detected on the surface of the coffee produced from sample 1. The amount is well within acceptable ranges and no more than would occur with roast and ground coffee. The coffee produced from sample A has an oil layer on the surface including large droplets of oil. The coffee is considered to be less acceptable.

EXAMPLE 4

Aroma Content Comparison

Tests are conducted using a sample of coffee powder containing capsules produced according to Example 2 (Sample 1 ) and a sample of coffee powder containing capsules produced according to Canadian patent 873,021 (Sample B).

A teaspoon of each sample is placed in a cup and hot water is added. The atmosphere above the cup is subjected to gas chromatography analysis. Sample 1 provides an average aroma component count higher than Sample B.

EXAMPLE 5

Steam Hydrolysis of Coffee Oil 500 g of coffee oil is loaded into a 1.5 liter high pressure bomb (Pressure Products Industries, Inc., Warminster, Pa., USA). Steam at 2070 kPa (300 psi) is directly injected into the pressure bomb to provide a reaction temperature of 204° C. (400° F.). The contents are held at the reaction temperature for about 1 minute. Then the pressure is released and the hydrolyzed oil removed. The hydrolyzed oil has a melting point of about 40° C. and a free fatty acid content of about 25%.

The hydrolyzed oil is used to prepare capsules as described in Example 2. Boiling water is added to a teaspoon of the capsules. A burst of coffee aroma above the cup is perceived. Small amounts of fine droplets of oil are detected on the surface of the coffee. The amount is well within acceptable ranges and no more than would occur with roast and ground coffee.

EXAMPLE 6

Pressure and Temperatures Hydrolysis of Coffee Oil

Coffee oil is added to water to make up 90% by weight of the mixture. The mixture is degassed under vacuum and placed in a Parr bomb and the bomb heated to 246° C. for 60 minutes. The bomb is placed in an ice bath to terminate hydrolysis. The bomb is allowed to depressurize and is opened. Once the oil has solidified, the aqueous phase is discarded. The hydrolyzed oil has a melting point in the range of 30° to 40° C. and a free fatty acid content of about 80%.

The hydrolyzed oil is used to prepare capsules as described in Example 2. Boiling water is added to a teaspoon of the capsules. A burst of coffee aroma above the cup is perceived. Small amounts of fine droplets of oil are detected on the surface of the coffee. The amount is well within acceptable ranges and no more than would occur with roast and ground coffee.

We claim:

1. A process for encapsulating a sensory agent, the process comprising:

forming an oil-in-water emulsion from a hydrolyzed vegetable oil, an aqueous medium, and water-soluble, carbohydrate-based, film forming agent, the aqueous phase of the emulsion containing at least 50% by weight of the film forming agent and the emulsion containing the sensory agent, and spraying the oil-in-water emulsion onto soluble beverage powder; the moisture content of the soluble beverage powder after spraying being less than 5% by weight.

2. A process according to claim 1 in which the oil-in-water emulsion is prepared by combining the hydrolyzed vegetable oil and the aqueous medium to form a water-in-oil emulsion and then adding the film forming agent to cause a phase inversion to provide the oil-in-water emulsion.

3. A process according to claim 2 in which the film forming agent is added in the form of a concentrated extract or in the form of dried, powdered, soluble solids.

4. A process according to claim 1 in which the oil-in-water emulsion is prepared by dissolving the film forming agent in the aqueous medium and then mixing in the hydrolyzed vegetable oil.

5. A process according to claim 1 in which the oil-in-water emulsion is prepared by adding a mixture of the aqueous medium and film forming agent to the hydrolyzed vegetable oil until the aqueous phase becomes the continuous phase.

6. A process according to claim 1 in which the concentration of the film forming agent in the aqueous phase is in the range of 50 to 75% by weight.

7. A process according to claim 6 in which the film forming agent is in the form of soluble coffee solids, the sensory agent is coffee aroma and the hydrolyzed vegetable oil is hydrolyzed coffee oil.

8. A process according to claim 7 in which the amount of hydrolyzed coffee oil in the oil-in-water emulsion is in the range of about 5 to 20% by weight.

9. A process according to claim 1 in which the sensory agent is incorporated in the hydrolyzed vegetable oil, in the components of the aqueous phase, or both, prior to formation of the emulsion.

10. A process according to claim 1 in which the sensory agent is incorporated into the emulsion after the formation of the emulsion.

11. A process according to claim 1 in which the film forming agent is in the form of soluble coffee solids, the sensory agent is coffee aroma and the hydrolyzed vegetable oil is hydrolyzed coffee oil.

12. A process according to claim 11 in which the amount of hydrolyzed coffee oil in the oil-in-water emulsion is in the range of about 5 to 20% by weight.

13. A process according to claim 1 further comprising the step of homogenizing the oil-in-water emulsion.

14. A process according to claim 1 in which the oil-in-water emulsion is sprayed through an atomizing nozzle which atomizes the emulsion into droplets of size in the range of about 0.4 to about 1 mm.

15. A process according to claim 14 in which the beverage powder is agitated while the emulsion is sprayed on it.

16. A process according to claim 1 in which the total moisture added to the beverage powder by the emulsion is less than about 1% by weight.

17. A process according to claim 1 in which the hydrolyzed vegetable oil comprises about 60% to about 85% free fatty acids and about 40% to about 15% mono-, di- and/or triglycerides.

18. A process for encapsulating coffee aroma, the process comprising:

forming an oil-in-water emulsion from (i) a hydrolyzed coffee oil which comprises about 60% to about 85% free fatty acids and about 40% to about 15% mono-, di- and/or triglycerides, (ii) water, and (iii) water-soluble coffee solids, the oil-in-water emulsion containing the coffee aroma and about 5 to 20% by weight of the hydrolyzed coffee oil and the aqueous phase of the oil-in-water emulsion containing about 50 to 75% by weight of the water-soluble coffee solids; and spraying the oil-in-water emulsion in droplets of size in the range of about 0.4 to about 1 mm onto soluble coffee powder; the moisture content of the soluble coffee powder after spraying being less than 4% by weight.

19. A soluble beverage powder comprising particles of soluble beverage having a moisture content of less than 5% by weight and to which are attached capsules; each capsule comprising an encapsulating layer of a water-soluble, carbohydrate-based, film forming agent about a core of hydrolyzed vegetable oil containing a sensory agent.

20. A soluble beverage powder according to claim 19 in which the film forming agent is in the form of soluble coffee solids.

21. A soluble beverage powder according to claim 20 in which the hydrolyzed vegetable oil is hydrolyzed coffee oil.

\* \* \* \* \*